(12) United States Patent
Ankney

(10) Patent No.: US 12,722,803 B2
(45) Date of Patent: Sep. 1, 2026

(54) APPARATUS FOR DELIVERING TORQUE STRUTS TO AND REMOVING TORQUE STRUTS FROM AN AIRCRAFT LANDING GEAR

(71) Applicant: Government of the United States, as represented by the Secretary of the Air Force, Wright-Patterson AFB, OH (US)

(72) Inventor: Brian Ankney, Sherwood, AR (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 753 days.

(21) Appl. No.: 18/297,030

(22) Filed: Apr. 7, 2023

(65) Prior Publication Data

US 2024/0336373 A1 Oct. 10, 2024

(51) Int. Cl.

| | |
|---|---|
| ***B66F 7/28*** | (2006.01) |
| ***B64F 5/10*** | (2017.01) |
| ***B66F 5/00*** | (2006.01) |
| *B64C 25/60* | (2006.01) |
| *B66F 3/24* | (2006.01) |
| *B66F 5/04* | (2006.01) |

(52) U.S. Cl.

CPC .................. *B64F 5/10* (2017.01); *B66F 7/28* (2013.01); *B62B 2203/10* (2013.01); *B64C 25/60* (2013.01); *B66F 3/24* (2013.01); *B66F 5/04* (2013.01)

(58) Field of Classification Search

CPC ...... B64F 5/10; B64F 5/40; B64F 5/50; B64C 25/60; B66F 3/24; B66F 5/04; B66F 9/18; B66F 3/36; B66F 3/42; B66F 15/00; B60P 3/125; B60R 9/06

USPC .......................................................... 254/126

See application file for complete search history.

(56) References Cited

U.S. PATENT DOCUMENTS 3,850,441 A * 11/1974 Peters ....................... B62B 1/08 280/47.27
5,605,207 A * 2/1997 Betcher ..................... B66F 5/04 187/244

(Continued)

FOREIGN PATENT DOCUMENTS

CN 120364612 A * 7/2025 ................ B66F 7/28
GB 2032385 A * 5/1980 ................ B66F 3/36

*Primary Examiner* — Mahdi H Nejad
(74) *Attorney, Agent, or Firm* — AFMCLO/JAZ; Larry L. Huston

(57) ABSTRACT

An apparatus for positioning, aligning, installing and removing a torque strut on a main landing gear of an aircraft having aft tandem inline wheels. The apparatus is mobile and has a generally isosceles frustro-triangular platform with three castors 18. The platform has two isosceles sides which are tapered together to fit into the space between the inline wheels. The third side of the triangular platform is notched to allow an operator to work inside the outline of the footprint. The platform has a jack to raise and lower the torque strut, as needed for the particular maintenance procedure. Two cradles are disposed on the top of the jack for receiving the torque strut. The cradles may be independently adjustable in the vertical direction to accommodate the precision necessary for installation and removal of the torque strut.

16 Claims, 5 Drawing Sheets

(56) References Cited

U.S. PATENT DOCUMENTS

| | | | | |
|---|---|---|---|---|
| 6,668,950 | B2 | 12/2003 | Park | |
| 9,139,214 | B2 * | 9/2015 | Rich | B62B 3/0606 |
| 11,673,778 | B2 * | 6/2023 | Zhang | E04H 12/00<br>187/213 |
| 2006/0175369 | A1 * | 8/2006 | Vermette | B60R 9/06<br>280/495 |
| 2012/0110816 | A1 * | 5/2012 | Groves | F01D 25/285<br>254/7 C |
| 2012/0118671 | A1 * | 5/2012 | Fiorese | B66F 7/0675<br>187/204 |
| 2013/0299757 | A1 * | 11/2013 | Krug | B66F 5/02<br>254/133 R |
| 2021/0221662 | A1 * | 7/2021 | Zhang | B66F 7/28 |
| 2023/0382562 | A1 | 11/2023 | Chasteau et al. | |

* cited by examiner

APPARATUS FOR DELIVERING TORQUE STRUTS TO AND REMOVING TORQUE STRUTS FROM AN AIRCRAFT LANDING GEAR

STATEMENT OF GOVERNMENT INTEREST

The invention described and claimed herein may be manufactured, licensed and used by and for the Government of the United States of America for all government purposes without the payment of any royalty.

FIELD OF THE INVENTION

The present invention is related to a jack for installation and removal of torque struts on aircraft having tandem, inline wheels, particularly to such a jack having a space to accommodate an operator inside the footprint and more particularly to such a jack having the capability to compensate for differences in elevation of fittings from the floor.

BACKGROUND OF THE INVENTION

The Lockheed Martin C-130 was first flown Aug. 23, 1954 and has been in production since 1956, with more than 2500 units sold into at least 60 countries. The C-130 is an all-metal, high-wing monoplane. The C-130 has four turboprop engines, two pairs of tandem in-line aft wheels and a pair of side-by-side forward wheels. There are currently three different C-130 platforms: the C-130E, C-130H and C-130J covering more than 70 variants. The C-130 has landed on aircraft carriers, the Himalayas and flown over both poles. Active duty locations for the C-130 are in the US, Japan and Germany.

The C-130 Hercules often performs the tactical portion of the airlift mission. For example, the C-130 can accommodate oversized cargo, including utility helicopters, six-wheeled armored vehicles, standard palletized cargo and military personnel. In an aerial delivery role, the C130 can airdrop loads up to 42,000 pounds. The C130 can use a high-flotation landing gear to land and deliver cargo on rough, airstrips. Maximum takeoff weights range from 69,750 kg to 74,390 kg with payloads of at least 19,000 kg.

Given the maximum weights and substantial payloads, an important part of the C-130 is the main landing gear (MLG). The MLG absorbs energy during impact, supports the aircraft during takeoff/ground operations and provides for steering and braking. The MLG raises and lowers the tandem inline aft wheels for flight and ground operation, respectively. A critical component of the MLG is a torque strut having a longitudinal axis and which keeps the inline wheels in the proper alignment during takeoff and landing.

Referring to FIG. 1, the torque struts 10 have a clevis at each end of the longitudinal axis with a through hole on each leg of the clevis. The clevis is inserted around an eye in the MLG. A through pin is inserted through the clevis/eye/clevis to secure the torque strut 10 in position. The through pin has a tight fit with the holes to prevent undesired movement during operations. The torque strut 10 weighs approximately 36 kg and has a service length for installation and removal of approximately 1.5 m. with gaps between the torque strut 10 and sensitive related components (switches, fuses, wires, hoses) as close as 6 cm. The tandem inline wheels have a center to center spacing of 1.5 m and a 15 cm for/aft space between the closest parts of the wheels (in line with the axles), herein referred to as a closest wheel space.

Current maintenance procedures require three persons to lift a torque strut 10 into proper position, align the eyes and clevis holes, hold the position steady, then install the through pins and secure the torque strut 10 into position. If the hangar floor where the maintenance occurs is uneven, the clevises will be at different elevations. Or if the clevises are out of alignment, insertion of the through pins cannot occur. Each of these problems increases maintenance time at the expense of service time. If one (or more) of the three personnel becomes fatigued, installation can be jeopardized and damage may result. Removal is equally challenging.

A better approach has been needed since 1956, when the C-130 began production. Such approach should consider human ergonomics, various hangar conditions with uneven floors and safe handling of a torque strut 10 for each of the three C-130 platforms using different generations of components from different vendors.

One attempt in the art to load and unload munitions for military aircraft is found in U.S. Pat. No. 6,668,950 to Parker. Parker teaches a weapons handling vehicle having a chassis with four omni wheels arranged in a rectangular footprint. But this vehicle is infeasible for a C-130 having inline tandem wheels, a floor which is uneven between installation/removal points or for a system requiring precise alignment—as necessary to remove and install C-130 torque struts 10 having two longitudinally opposed close tolerance clevis/eye/clevis assemblies.

Accordingly, what is needed is a mobile apparatus having a jack and which can overcome the problem of accommodating tight tolerances for heavy spaced apart clevis assemblies without interference from nearby inline wheels. What is needed is such an apparatus which can accommodate an operator within the apparatus footprint. What is needed is such an apparatus which can compensate for differences in elevation between the floor and torque strut 10 attachment points.

SUMMARY OF THE INVENTION

In one embodiment the invention comprises an apparatus usable with an aircraft having spaced apart inline tandem wheels. The apparatus comprises a mobile platform defining an XY plane and a Z direction perpendicular to the XY plane. The platform has a generally isosceles triangular shape with two equal isosceles sides and a notched side connecting the two isosceles sides. The two isosceles sides taper towards each other to fit between the tandem inline wheels. The two isosceles sides are oppositely and divergently connected by a notched side. The notch provides a space for an operator therein to advantageously and ergonomically perform maintenance on the C-130 MLG while positioned at least partially within the outline of the footprint of the platform. The apparatus also comprises at least one jack for vertically raising and lowering a torque strut proximate the MLG and at least one cradle disposed on the jack for removably receiving a torque strut therein. In one embodiment the apparatus may comprise two cradles which are independently adjustable in the Z direction.

DETAILED DESCRIPTION OF THE INVENTION

Figures 1, 2:
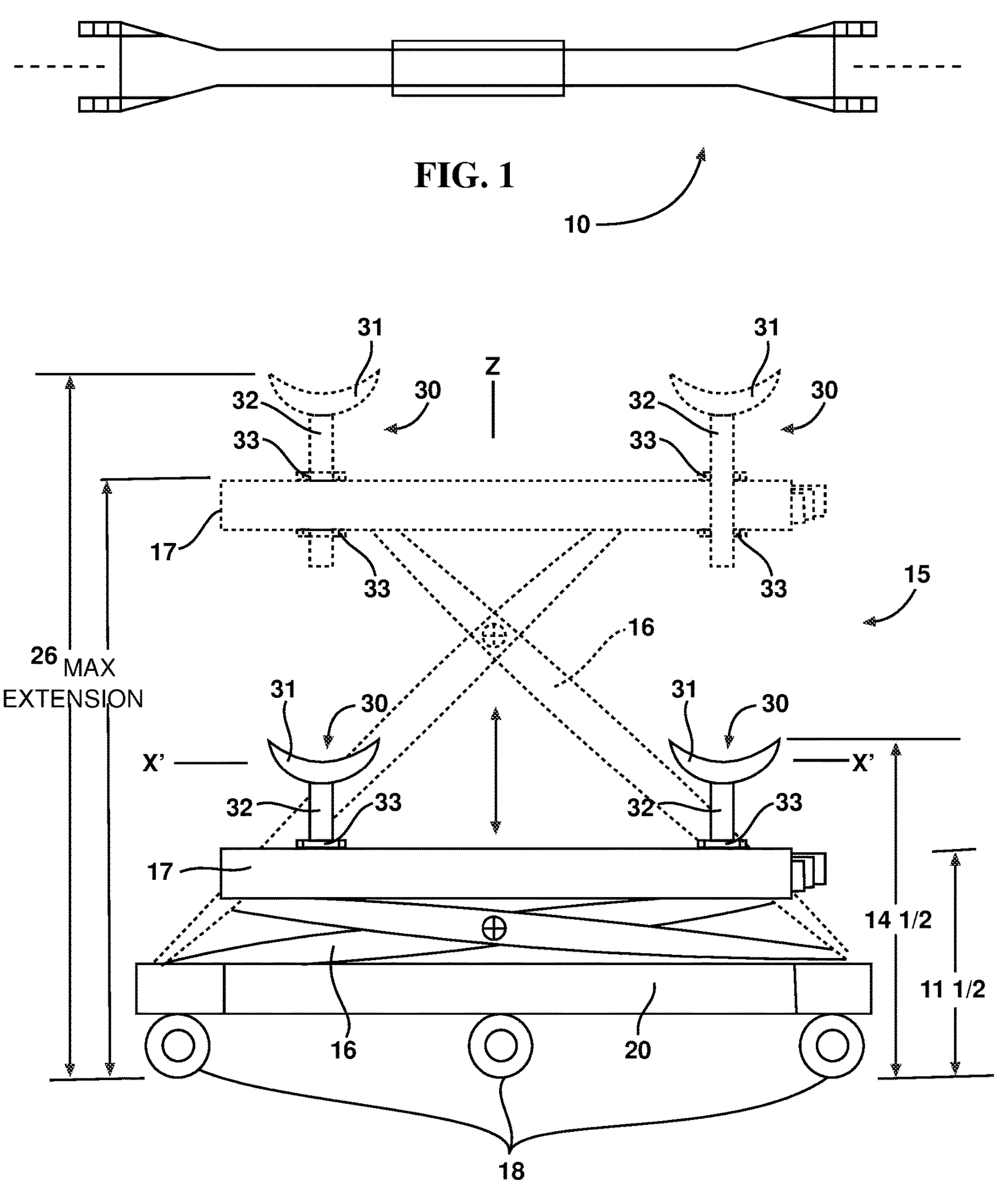
FIG. 1 is a schematic top plan view of a torque strut for an aircraft having tandem inline wheels.
FIG. 2 is schematic side elevational view of an apparatus according to the present invention with a single stage and two cradles, the cradles being rotated 90 degrees about the vertical axis for clarity, with a first retracted position being shown in solid and a second extended position being shown in phantom.

Referring to FIG. 2, the present invention comprises an apparatus 15 for installing and removing a torque strut 10 on the main landing gear of an aircraft having tandem inline wheels, particularly a Lockheed C-130. The apparatus 15 comprises a platform 20 supported by at least and preferably three castors 18, a jack 16 disposed on the platform 20 for raising and lowering the torque strut 10 in the vertical direction of the arrows, an optional stage 17 on top of the jack 16 and at least one cradle 30 disposed on the top of the jack 16, preferably mounted upon the stage 17. The apparatus 15 may be made of steel, aluminum and/or any other material having the capacity to handle the intended loads as set forth below.

With continuing reference to FIG. 2, the jack 16 may be a scissor jack 16. The scissor jack 16 may be a single stage scissor jack 16, as shown, or may comprise plural stages of scissors, as is known in the art. The scissor jack 16 may be manually actuated by a drive screw substantially parallel to the longitudinal axis of the torque strut 10 or may be motorized. The drive screw is preferably at the top of the jack 16 and parallel to the longitudinal axis for ergonomics and may have a handle as is known in the art. Preferably the jack 16 is adjacent the notch 23, as shown, for improved stability.

The top of the jack 16 may have a stage 17 thereon. The stage 17 is generally planar, unless there is a specific and unique maintenance procedure which requires a stepped platform 20. The stage 17 provides a base for at least two upstanding cradles 30 as described below. The stage 17 may have two through holes for attachment of the two upstanding cradles 30, respectively. The holes may be tapped and threaded or not, as desired. The stage 17 may be made of steel plate having a thickness of 2.5 to 4.5 and particularly 3.2 mm.

The stage 17 may be generally rectangular or any other suitable shape. A rectangular stage 17 may have a length 23X parallel to the X and X' axes of 33 cm to 58 cm, 41 cm to 51 cm and particularly 46 cm. A rectangular stage 17 may have a length 23Y parallel to the Y axis of 10 cm to 28 cm, 13 cm to 20 cm and particularly 15 cm. The top of the stage 17 may optionally have a perimetric flange 29 to retain miscellaneous objects thereon.

The top surface of the stage 17 of the scissor jack 16 may have a collapsed/retracted height of 20 cm to 40 cm relative to the floor, and particularly 30 cm from the floor in a first position and a lifted/extended height of 50 cm to 70 cm, and particularly 58 cm in a second position to provide a Z direction lift of 25 cm to 35 cm and particularly 28 cm. The scissor jack 16 should have a lift capacity of 450 kg to 900 kg. and preferably at least 500 kg. Likewise the castors 18, platform 20 and all other components loadbearing components should have a capacity if at least 500 kg to 900 kg.

Figure 3A:
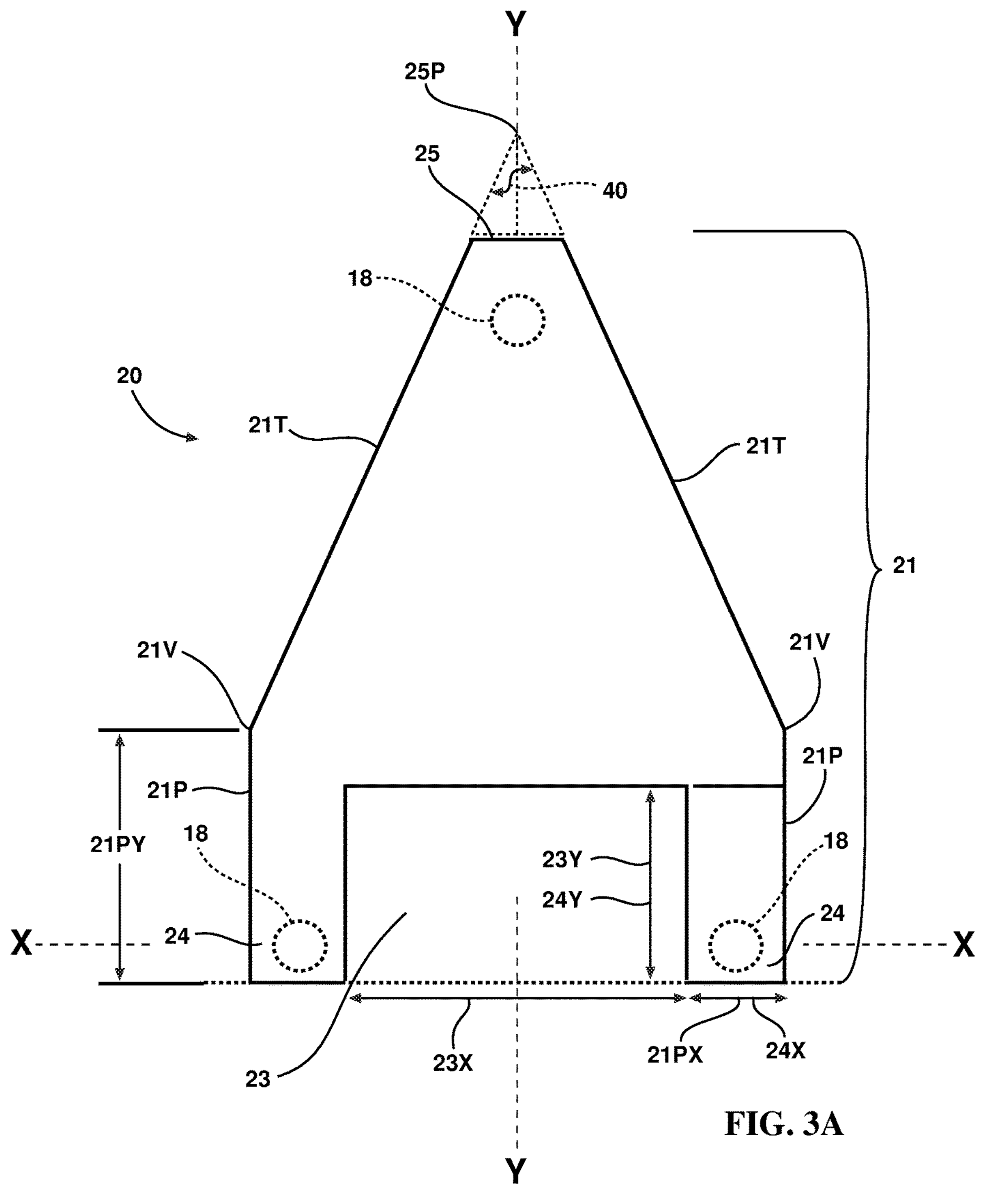
FIG. 3A is a scale top plan view of one suitable for platform of the apparatus of FIG. 2 showing schematic castors in phantom.
Figure 3B:
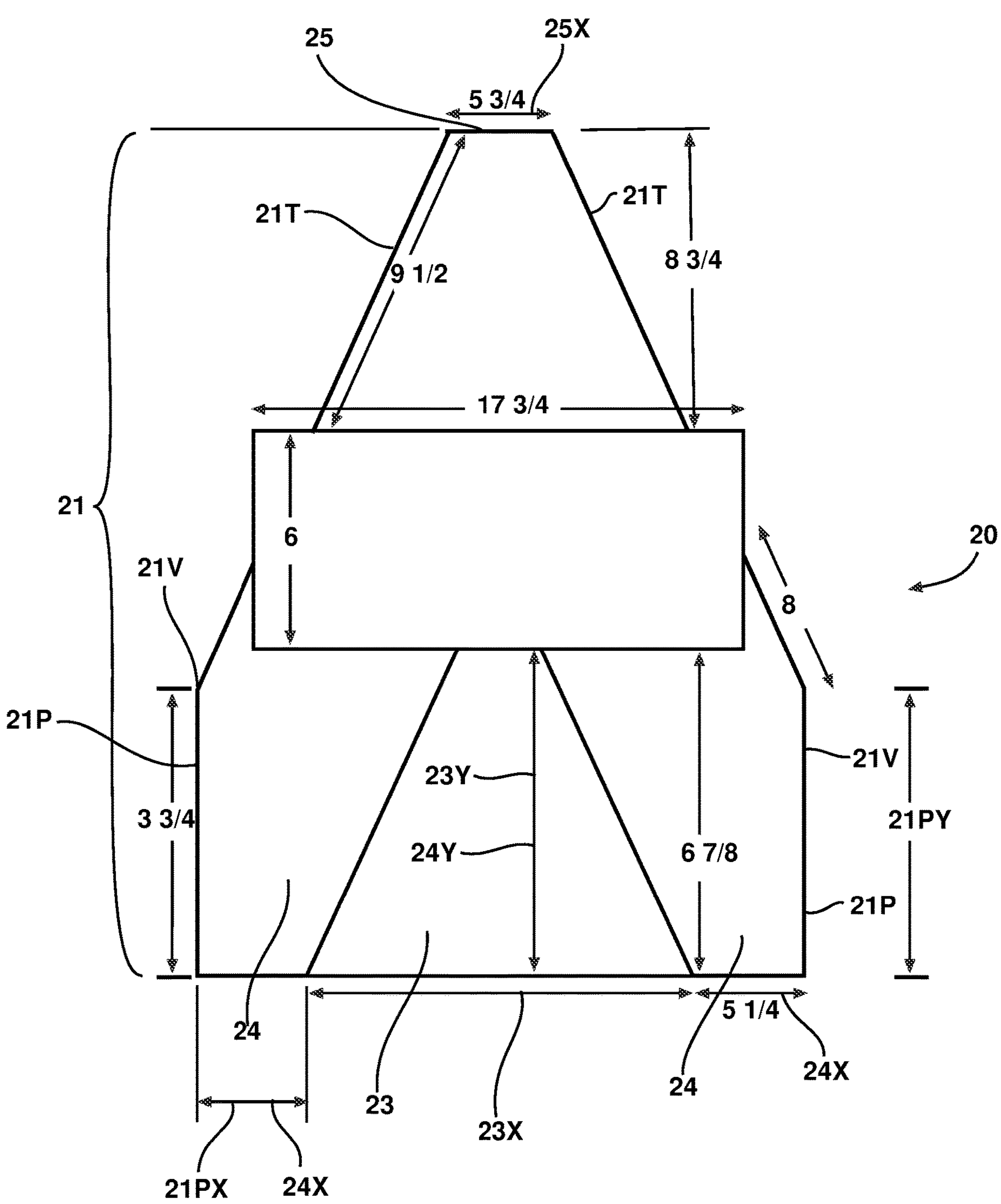
FIG. 3B is a scale top plan view of an alternative embodiment of a platform showing the having a superimposed stage for the cradles.

Referring to FIGS. 3A and 3B, and examining the invention in more detail, the platform 20 defines an XY plane and a Z direction perpendicular thereto. In use, the XY plane is substantially parallel to the floor and the Z direction is vertical. The X axis is parallel to the axis of the platform 20 and intercepts the centers of the castors 18 proximate the notched side 22 of the platform 20. The X' axis is also parallel to the major axis of the platform 20, parallel to the X axis and intercepts the centers of the cradles 30. In use the X' axis will be subjacent the longitudinal axis of the torque strut 10. The Y axis is the perpendicular bisector of the X and X' axes. The platform 20 has a generally isosceles triangular footprint or isosceles frustro-triangular footprint. Preferably the generally triangular footprint is frustro-triangular and isosceles. The isosceles triangular footprint has two isosceles sides 21 joined at a frustrum 25 and joined by a notched side 22.

The notch 23 provides a space within the XY plane and footprint of the platform 20. The space can accommodate an operator for precise placement, alignment, installation, removal and servicing of the torque strut 10. The notch 23 provides space for the operator to maneuver inside the outline of the footprint of the platform 20. Laterally outboard of the notch 23 in the X direction are two outriggers 24 which provide support for the respective castors 18 and a place for tools, goggles, lubricant, etc.

The outline of the footprint is defined by the frustrum 25 or point 25P, the isosceles sides 21 and a straight line connecting the outriggers 24. Furthermore the notch 23 provides space for the operator to maneuver the torque strut 10 around hydraulic lines, hoses and other components of the MLG. Damage to such components is more easily avoided if the operator can position himself/herself within the notch 23 and have visibility of both ends of the torque strut 10 more in line with the X axis than is possible with the known prior art.

The isosceles sides 21 are preferably convergent as the frustrum 25 is approached, to conserve footprint, particularly width. More preferably, the isosceles sides 21 are bent so that the portions supporting the castors 18 are perpendicular to the vector of the notched side 22. While a platform 20 having rectilinear sides is shown, one of skill will recognize the invention is not so limited. The sides of the platform 20 may be curvilinear. More particularly the isosceles sides 21 of the platform 20 may be convex or more preferably concave, to reduce interference with the inline wheels.

The notched side 22 of the platform 20 has a total length parallel to the X and X' axes ranging from 51 cm to 76 cm, 53 cm to 74 cm, 58 cm to 69 cm and particularly 64 cm. The outriggers 24 may each have a length 24X parallel to the X and X' axes of 9 cm to 18 cm, 10 cm to 15 cm and particularly 13 cm. The outriggers 24 may have a length 24Y in the Y direction of 10 cm to 20 cm, 13 cm to 18 cm and particularly 15 cm. The length 24Y of the outriggers 24 in the Y direction corresponds to the length of a parallel segment 21P of an isosceles side 21 as discussed herein.

If the notched side 22 is too long maneuverability is compromised or the outriggers 24 will be too narrow to properly transmit compressive loads to the castors 18. If the notched side 22 is too short there is insufficient space for the notch 23 and consequently for the operator to fit within the notch 23, and furthermore the structure may be unstable due to the castors 18 being too close together. Likewise, if the outriggers 24 are too narrow in the X direction, twisting and/or buckling will occur under the load of the torque strut 10. If the outriggers 24 are too wide in the X direction the notch 23 space is compromised unless the total length of the platform 20 in the X direction is unduly large and unwieldy.

Each of the isosceles sides 21 preferably has two segments joined at a vertex 21V, a tapered segment 21T and a parallel segment 21P. The tapered segment 21T converges as the frustrum 25 or point 25P is approached and diverges from the frustrum 25 or point 25P as the notched side 22 is approached. Preferably the tapered segment 21T does not intercept the notched side 22, but instead is joined at the vertex 21V to a parallel segment 21P which intercepts the notched side 22. The parallel side may be parallel to the Y axis. Alternatively the parallel segment 21P may slightly taper toward the Y axis, so long as there is sufficient space for the castor 18 and notch 23. Importantly, this geometry provides the benefit that the tapered segments 21T, in combination, allow for the apparatus 15 to fit between the tandem tires of the C-130 or like aircraft while the parallel segments 21P, in combination, prevent the apparatus 15 from taking up undue space when transporting the torque struts 10 or while in storage.

The parallel segment 21P may have a length 21PX parallel to the X and X' axes of the platform 20 ranging from 10 cm to 20 cm, 13 cm to 18 cm and particularly 15 cm. As discussed herein relative to the outriggers 24, the length 21PY of the parallel segments 21P in the Y direction may also range from 10 cm to 20 cm, 13 cm to 18 cm and particularly 15 cm.

The length of the tapered segment 21T of the isosceles side 21 may float as is geometrically necessary to complete the notched polygon formed by the platform 20. Generally a tapered segment 21T which is straight may range from 40 cm to 80 cm. While an isosceles side 21 having a single tapered segment 21T meeting the parallel segment 21P at the vertex 21V is shown, one of skill will understand there may be plural tapered segments 21T intermediate the vertex 21V and frustrum 25 or point 25P.

The isosceles sides 21 may connect at a frustrum 25 or point 25P having an included angle 40 ranging from 40 degrees to 70 degrees, 50 degrees to 60 degrees and particularly 55 degrees. Preferably the included angle 40 is not more than 70 degrees, to conserve overall X direction length and avoid obstruction with the inline tandem tires. The isosceles sides 21 are tapered to fit into the space between the inline wheels. The isosceles sides 21 are preferably truncated at a frustrum 25, as shown, to conserve footprint and prevent a sharp corner from hitting one of the tires or nearby personnel. The frustrum 25 may have a length 25X parallel to the X and X' axes of the platform 20 ranging from 10 cm to 20 cm, 13 cm to 18 cm and particularly 15 cm.

If the included angle 40 at the frustrum 25 or point 25P is too great, the platform 20 is too wide and maneuverability is compromised. If the included angle 40 at the frustrum 25 or point 25P is too narrow, the platform 20 will be unstable and tipping may result causing injury or damage to the torque strut 10. If the frustrum 25 is too wide, the platform 20 will not fit into the space between the tandem aft wheels and line of sight along the X' axis is lost. If the frustrum 25 is too narrow, the platform 20 will not fit into the space between the tandem aft wheels and line of sight along the X' axis is lost.

The notch 23 may have a length 23X, parallel to X and X' axes from 32 cm to 45 cm, 33 cm to 43 cm, 35 cm to 41 cm and particularly 38 and a length 23Y parallel to the Y axis from 13 cm to 27 cm, 15 cm to 25 cm, 18 cm to 23 cm and particularly 20 cm. These dimensions are needed to allow personnel to fit therein for manipulation of hydraulic lines, hoses, etc. during placement/installation/removal and alignment of the torque strut 10 clevis with the holes on the MLG. The notch 23 may have an aspect ratio defined as the length 23X to depth 23Y ratio (X direction length 23X to Y direction depth 23Y ratio of the notch 23). Preferably the aspect ratio is greater than 1, preferably is greater than 2 and preferably ranges from 1.5 to 2.7. The aspect ratio is important so that the that an operator fully or partially within the notch 23 may maneuver in the X and Y directions as needed to perform the maintenance, such as torque strut 10 removal and replacement.

The notch 23 may have constant dimensions throughout, as shown or may have variable length 23X, 23Y. If the notch 23 has variable dimensions, the dimensions are taken at the respective maxima. For example, the notch 23 may taper inwardly as the frustrum 25 is approached. The arrangement provides the benefit that a wider notch 23 can be used at the notched side 22 to allow more maneuverability.

If the notch 23 length 23X in the X direction is too great, the strength of the platform 20 is compromised and twisting or even collapse of the outriggers 24 from the XY plane will occur. The torque strut 10 may be damaged, or injury may occur. If the notch 23 length 23X in the X direction is too small, maneuverability and ergonomics are compromised as the operator cannot fit into the notch 23 and have eyesight juxtaposed with the X' axis. Likewise, if the notch 23 length 23Y in the Y direction is too great the platform 20 will not have enough footprint to accommodate the jack 16. Again, If the notch 23 length 23Y in the Y direction is too small, maneuverability and ergonomics are compromised as the operator cannot fit into the notch 23 and have eyesight juxtaposed with the X' axis.

The platform 20 preferably has three castors 18 for maneuverability, although additional castors 18 may be provided to increase load capacity. The castors 18 make the platform 20 mobile in all directions and rotatable on a zero radius. One castor 18 is proximate the frustrum 25 or point 25P if a frustrum 25 is not used. Two castors 18 are proximate the ends of the notched side 22. A line between these two castors 18 defines the X axis of the platform 20 which may generally parallel to the longitudinal axis of an installed torque strut 10 when the apparatus 15 is in use. As used herein the term "castors 18" is also inclusive of straight wheels, swivel wheels, omni wheels, roller balls and combinations thereof. If desired, each castor 18 may have a brake as is known in the art.

The Y axis is preferably the perpendicular bisector of the notched side 22 and of the notch 23 and preferably intercepts the third castor 18 proximate point 25P or frustrum 25 thereof. Preferably, but not necessarily, the platform 20 is symmetric about the Y axis.

Optionally the platform 20 may have a perimetric flange 29 upstanding in the Z direction. The perimetric upstanding flange 29 may circumscribe the platform 20 or only subtend a portion of the perimeter of the platform 20. The flange 29 may retain hand tools, lubricant, safety gear, etc. on the platform 20 for convenience. While a platform 20 which is symmetric about the Y axis is shown, one of skill will understand a platform 20 asymmetric about the Y axis is contemplated and within the scope of the invention except as may be limited by the claims below. The platform 20 may be made of steel plate having a thickness of 2.5 to 4.5 and particularly 3.2 mm.

Figure 4:
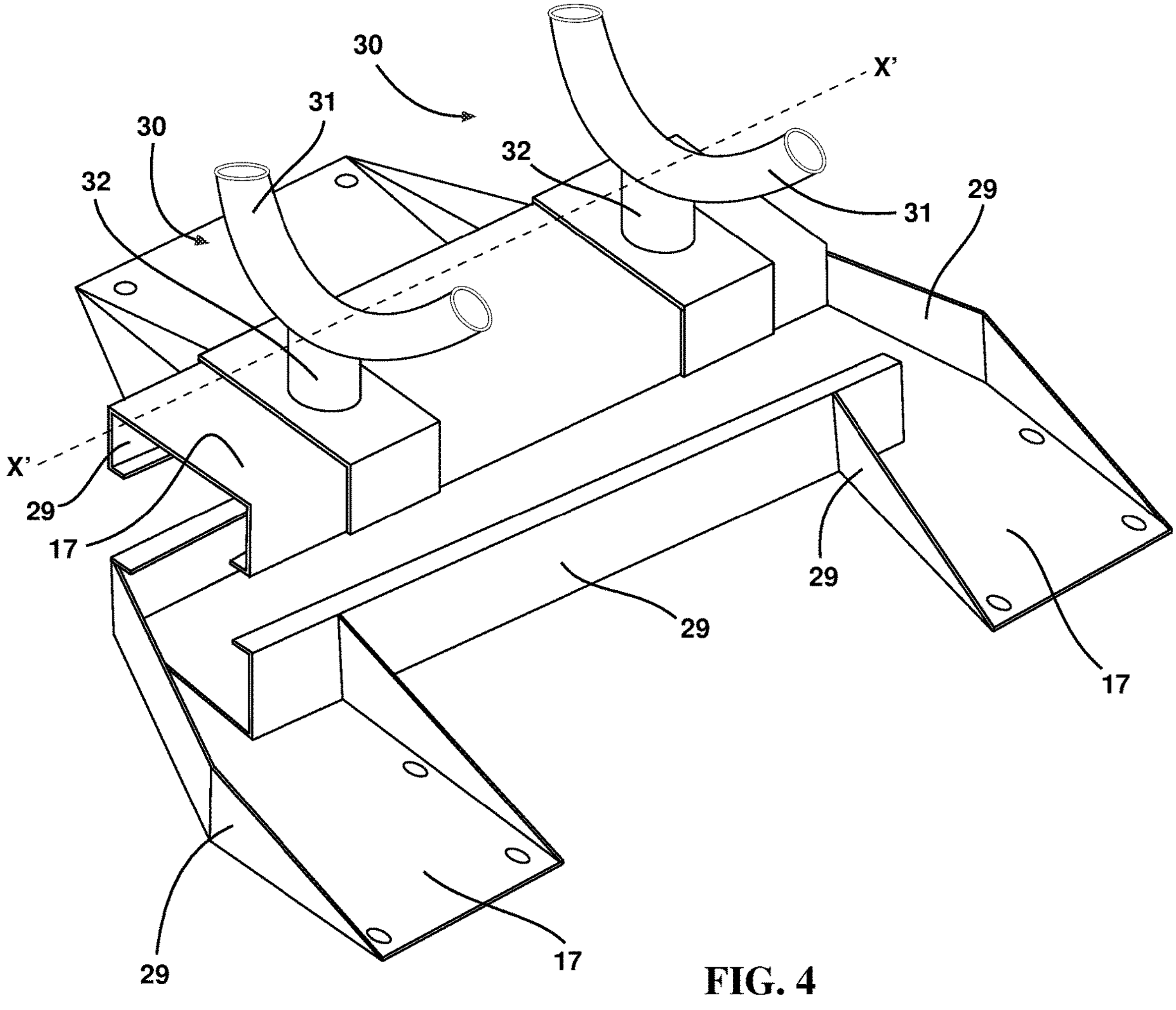
FIG. 4 is a scale perspective view of a stage and cradle for an apparatus of the present invention.

Referring to FIG. 4, the cradle 30 is rigidly joined to and extends upwardly from the top of the jack 16 and particularly upwardly from the stage 17 thereof. The cradle 30 comprises three components: an attachment to the stage 17, an upright 32 and a mount 31 which is preferably concave upwards. The cradle 30 preferably subtends less than 180 degrees to provide a funnel effect when receiving or removing a torque strut 10. A single cradle 30 having an extent in the X direction sufficient to provide stability in the X direction may be used. Alternatively and preferably, two cradles 30 spaced apart in the X' direction cradles 30 are used as shown. One of skill will recognize that while two cradles 30 are illustrated, any suitable plurality of cradles 30 may be used to support the torque strut 10 so long as precision alignment may be achieved.

The uprights 32 are preferably perpendicular to the stage 17 and parallel to the Z axis. The uprights 32 may be attached to the stage 17 by welding if further vertical adjustment is deemed unnecessary during operation. Alternatively, each upright 32 may be threaded and inserted through a hole in the stage 17. A jam nut 33 may be disposed on upright 32 above and below the stage 17 to securely hold the cradle 30 in position. If desired, each cradle 30 may be adjusted up or down, independent of the other cradle 30, to provide proper clearance and height for a particular maintenance procedure on a particular aircraft. This embodiment provides the benefit that a first cradle 30 may be swapped out for a different cradle 30 as appropriate. Alternatively or additionally, the hole through the stage 17 may be threaded so that only a single jam nut 33 is needed. This embodiment provides the benefit that proper vertical alignment can be assured.

Both embodiments provide the benefit that the plural cradles may be separately and individually adjusted to different elevations above the stage 17. For example, if the floor is not level or a particular aircraft has uneven hardware, the cradles 30 may be individually and uniquely adjusted to accommodate these differences.

The mounts 31 may be spaced apart 30 cm to 50 cm in the X' direction to fit within the footprint of the stage 17. If the spacing is too small, instability and tipping may occur. If the spacing is too large footprint may be unduly enlarged and maneuverability jeopardized. If the spacing is too small, the torque strut 10 will be unstable. Preferably each cradle 30 is inside the footprint of the castors 18 for maintaining the center of gravity. The cradles 30 may be padded to minimize damage and scuffing of the torque strut 10. An optional strap may be used to bind the torque strut 10 to the cradle 30 and prevent the torque strut 10 from becoming dislodged and falling out of the cradle 30 during transport.

The cradles 30 may have an ID of 15 cm to 30 cm, 20 cm to 25 cm, and more preferably 23 cm. The cradles 30 may be made of steel wire having a diameter of 2 cm to cm and particularly 2.5 cm. If desired, the steel wire may be hollow with an OD of 2.5 cm and an ID of 1.9 cm.

Figure 5:
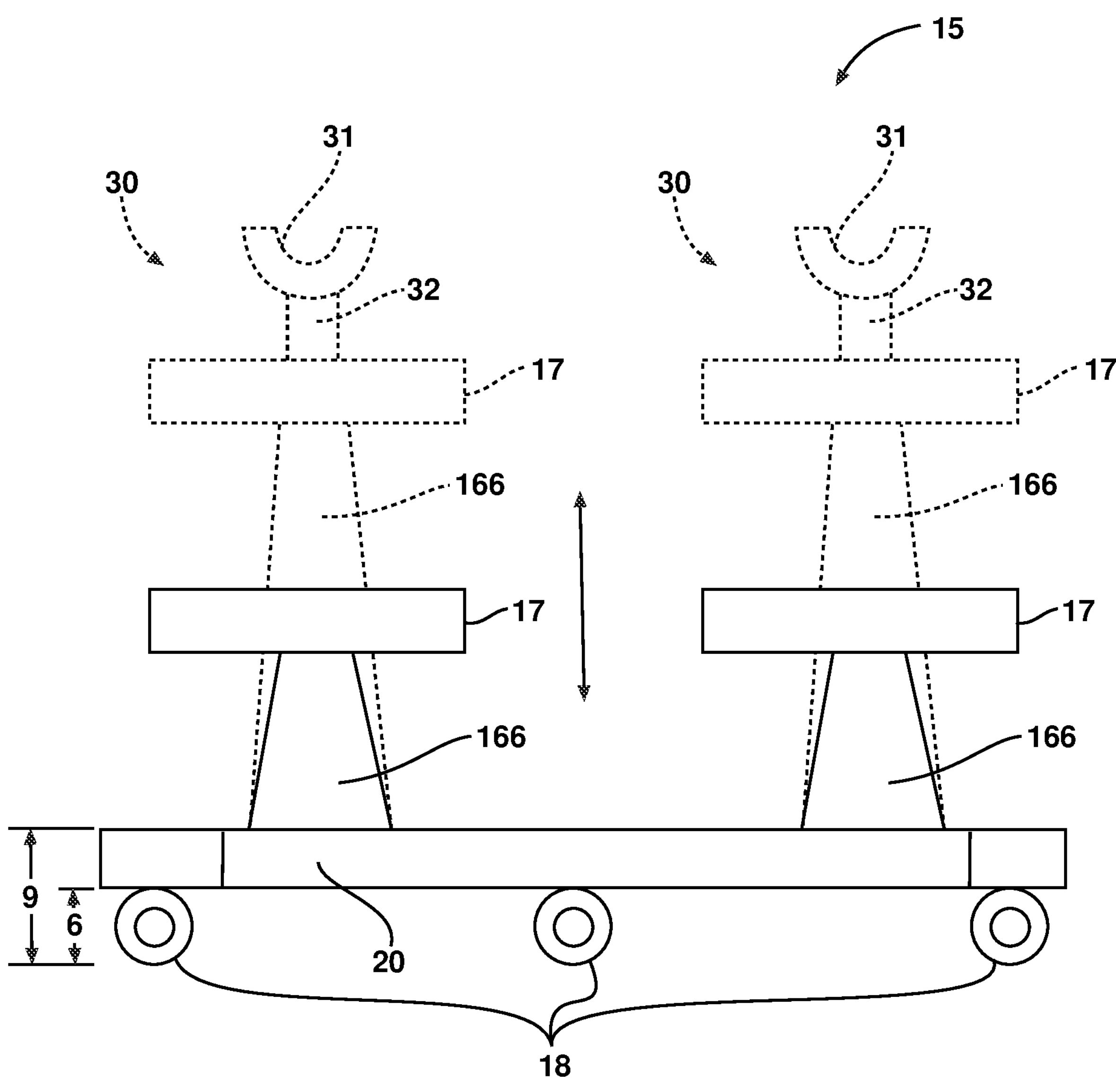
FIG. 5 is a schematic side elevational view of an alternative embodiment of an apparatus according to the present invention having dual hydraulic jacks, each jack having a dedicated stage, with a first retracted position being shown in solid having the cradles omitted for clarity and a second extended position being shown in phantom with the cradles rotated 90 degrees about the vertical axis for clarity.

Referring to FIG. 5, in a second embodiment, instead of a single jack 16 two jacks 166 spaced apart in the X direction may be used to support the torque strut 10, the pair of jacks 166 being shown at mutually different raised elevations. This embodiment provides the benefit that each jack 166 may be individually adjusted to accommodate the need for different elevations of the longitudinally opposed end of the torque strut 10. This embodiment provides the further benefit that adjustment may be made 'on the fly' during the procedure. For example if it is discovered that one end of the torque strut 10 is too high or two low during the procedure, compensating adjustments may be made in real time.

If desired a hydraulic jack 166 having a hand pump, commonly referred to as a bottle jack 166, may be used in place of, in addition to or in combination with a scissor jack 16. Bottle jacks 166 are preferred for this embodiment due to the smaller combined footprint than a comparable scissors jack 16. The pump of the hydraulic jack 166 may be powered if manual actuation is not desired. One of skill will recognize that a bottle jack 166 may be used with the first embodiment.

If desired the dual jack 166 embodiment may have a single stage 17 for simplicity. Alternatively, each bottle jack 166 may have a respective dedicated stage 17. This embodiment provides the benefit each stage 17 may be customized for a particular end of the torque strut 10 or location of the MLG.

The present invention has been used for 21 removal/installation cycles of C-130 torque struts 10. Removal and replacement of a torque strut 10 has been reduced from 27 man-hours to 2 man-hours using the apparatus 15 of the present invention—a savings of more than 90% with increased safety. Personnel requirements have been reduced from three persons to only a single person. Removal/installation time has been reduced from 9 hours to 2 hours with no damage to any torque strut or other MLG component.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa. While particular embodiments of the present invention have been illustrated and described, it would be obvious to those skilled in the art that various other changes and modifications can be made without departing from the spirit and scope of the invention. It is therefore intended the appended claims cover all such changes and modifications that are within the scope of this invention. While the invention has been described in terms of being used for a torque strut 10, the torque strut 10 forms no part of the claimed invention. Furthermore, the invention may be used for other objects having a geometry similar to the torque strut 10.

What is claimed is:

1. An apparatus having an X axis defining an X direction and a Y axis perpendicular thereto defining a Y direction and usable with an aircraft having spaced apart inline tandem wheels, and adapted to support a torque strut for installation to and removal from the aircraft, the apparatus comprising:

a mobile platform defining an XY plane and a vertical Z direction perpendicular thereto, the platform having a generally isosceles triangular shape with two equal isosceles sides and a notched side with a notch for accommodating an operator therein, the notch having an aspect ratio defined by the length in the X direction to the depth in the Y direction of 1.5 to 2.7 and connecting the two isosceles sides, the two isosceles sides convergently having an included angle ranging from 40 degrees to 70 degrees and diverging as the notched side is approached, wherein the two isosceles sides converge proximate a frustrum and wherein each isosceles side comprises a tapered segment and a respective parallel segment connected thereto at a vertex, the parallel segment being parallel to the Y direction and intercepting the notched side and the tapered segment extending from the frustrum to the vertex, whereby the platform comprises two tapered segments which converge as the frustrum is approached and two spaced apart parallel segments, the segments parallel to the Y axis having a first length in the Y direction and the tapered segments having a second length in the Y direction greater than the first length;

a jack disposed on the platform for vertically raising and lowering the torque strut proximate a main landing gear of a complementary aircraft; and at least one cradle disposed on the jack for receiving the torque strut therein.

2. An apparatus according to claim 1, wherein the notched side has a length in the X direction from 51 cm to 76 cm.

3. An apparatus according to claim 1, wherein the notch has a length in the X direction from 32 cm to 45 cm.

4. An apparatus according to claim 1, wherein the platform has an isosceles frustro-triangular shape with the frustrum having a length in the X direction from 10 cm to 20 cm.

5. An apparatus according to claim 1, wherein the parallel segment has a length in the Y direction from 10 cm to 20 cm.

6. An apparatus according to claim 1, wherein the notch is convergently tapered towards the frustrum.

7. An apparatus having an X axis and a Y axis perpendicular thereto and being usable with an aircraft having a pair of inline tandem wheels with a closest wheel space of 10 cm to 20 cm, the apparatus comprising:

a mobile platform defining an XY plane and a vertical Z direction perpendicular thereto, the platform having a generally isosceles triangular shape with two equal isosceles sides convergently defining a frustrum therebetween and an opposed notched side divergently connecting the two isosceles sides, the frustrum having an included angle ranging from 50 degrees to 60 degrees, the isosceles sides each having a respective segment parallel to the Y axis and intercepting the notched side of the platform and a respective tapered segment connected to the parallel segment at a vertex and extending therefrom to the frustrum, the notched side having a notch for accommodating an operator and having an aspect ratio defined by the length in the X direction to the depth in the Y direction of 1.5 to 2.7, the segments parallel to the Y axis having a first length in the Y direction and the tapered segments having a second length in the Y direction greater than the first length;

a jack for vertically raising and lowering the torque strut proximate a main landing gear of a complementary aircraft and being disposed on the platform; and two spaced apart cradles disposed on the jack for removably receiving the torque strut therein.

8. An apparatus according to claim 7 further comprising a generally planar stage parallel to the XY plane and disposed on top of the jack wherein the spaced apart cradles are joined to and upstanding from the stage.

9. An apparatus according to claim 8 wherein, the two spaced apart cradles are independently adjustable in the Z direction.

10. An apparatus according to claim 9 wherein, each of the two spaced apart cradles is threaded and held in place with a respective jam nut against the platform.

11. An apparatus according to claim 7, wherein the jack is a bottle jack.

12. An apparatus having an X axis defining an X direction and a Y axis perpendicular thereto defining a Y direction perpendicular thereto and usable with a C-130 aircraft having spaced apart inline aft tandem wheels, the apparatus comprising:

a frustro-triangular mobile platform defining an XY plane and a vertical Z direction perpendicular thereto, the platform having a generally isosceles triangular shape for fitting between the spaced apart aft inline tandem wheels, with two equal isosceles sides and a a side having a notch which connects the two isosceles sides, the notch having an aspect ratio defined by the length in the X direction to the depth in the Y direction of 1.5 to 2.7, the two isosceles sides forming an included angle ranging from 40 degrees to 70 degrees, the notch having a length in the X direction of 32 cm to 45 cm and a length in the Y direction of 13 cm to 27 cm for accommodating an operator within an outline of a footprint of the platform, the segments parallel to the Y axis having a first length in the Y direction and the tapered segments having a second length in the Y direction greater than the first length; and two jacks spaced apart in the X direction, each jack having a cradle disposed on a top thereof and being configured for removably receiving the torque strut therein, the two jacks being adapted for independently vertically raising and lowering the torque strut proximate a main landing gear of a complementary aircraft and being disposed on the platform.

13. An apparatus according to claim 12, wherein the two spaced apart jacks are independently operable to raise and lower the torque strut received therein.

14. An apparatus according to claim 13, wherein the two spaced apart jacks comprise mutually identical manually actuated bottle jacks.

15. An apparatus according to claim 14, wherein the two spaced apart jacks have a combined load capacity of 500 to 900 kg.

16. An apparatus according to claim 13, wherein the two spaced apart jacks have a Z direction lift of 25 to 35 cm.

* * * * *